Patented July 16, 1929.

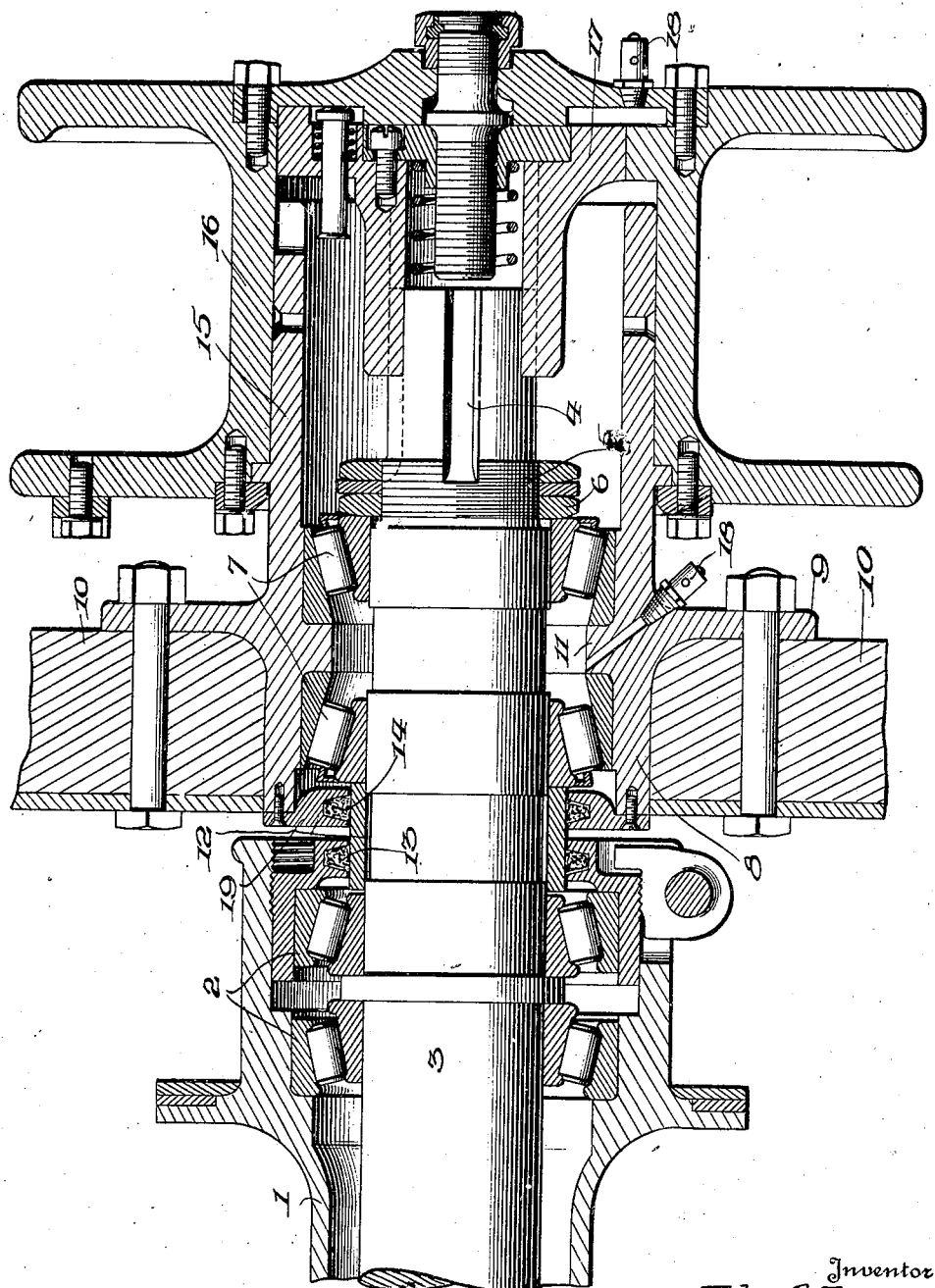

1,721,235

UNITED STATES PATENT OFFICE.

JOHN C. THOMAS, OF TULSA, OKLAHOMA, ASSIGNOR, BY MESNE ASSIGNMENTS, TO BRADEN STEEL & WINCH COMPANY, OF TULSA, OKLAHOMA, A CORPORATION OF OKLAHOMA.

ATTACHMENT FOR MOTOR VEHICLES.

Application filed December 8, 1925. Serial No. 74,043.

My invention consists in new and useful improvements in axle and bearing arrangement for motor vehicles and is an improvement on the device shown in the pending applications of Charles E. Ryan and Thomas J. Schuetz, Serial Nos. 62,065 and 62,066.

The object of my invention is to provide a special axle and additional set of bearings whereby the driving attachment disclosed in the aforementioned applications may be applied to vehicles normally employing semi-floating axles, to greater advantage.

With the above and other objects in view which will appear as the description proceeds, my invention consists in the novel features herein set forth, illustrated in the accompanying drawing and more particularly pointed out in the appended claims.

In the drawing 1 designates an ordinary rear axle housing, and 2 the axle bearings. 3 represents a special axle shaft which replaces the conventional semi-floating axle, and is identical therewith up to the point where it projects through the axle bearings 2, where instead of being reduced to a conical shape, it continues straight for a portion of its length and is preferably about one inch greater in length. The end 4 of this axle is reduced and splined, and threaded at the inner end of the splines as at 5 to receive lock nuts 6.

7 designates hub bearings, preferably of the roller type, which are mounted directly on the axle shaft 3 and upon which the projected hub 8 is rotatably mounted. This hub serves as a wheel mounting, and is provided with an outwardly extending flange 9 adapted to be bolted to the wheel 10. An internal flange 11 extends between the bearings 7, the outer of which retains said hub on the axle when the lock nuts 6 are in place.

12 is a spacer bushing mounted on the axle shaft between the axle bearings 2 and the hub bearings 7, whereby said bearings are spaced apart. 13 and 14 are packers secured in the outer end of the axle housing and the inner end of the hub respectively, and extending around said bushing 12.

The projecting sleeve 15 on the hub 8, the drum 16 rotatably mounted thereon and actuated by the clutch 17 which is longitudinally slidable on the splined end 4 of the axle shaft, are all identical with those disclosed in said applications, Serial Nos. 62,065 and 62,066 and need no further discussion here, as they form no part of this invention.

The application of my invention is as follows:

The usual semi-floating axle is removed from the axle housing and the special axle shaft 3 inserted in its place. The bearings 2 are inserted and the bushing 12 and packers 13 and 14 secured in position as shown. The inner bearing 7 is then placed on the axle when the hub 8 with the wheel 10 thereon, is mounted, the internal flange 11 abutting the outer edge of the bearing and securing it in place. The outer bearing 7 is slipped on the axle 3 until it abuts the said flange 11 on its outer side to retain said hub and wheel on the axle when the lock nuts 6 are screwed on the threads 5 of the axle 3. The grease retainer ring 19, together with the packer 14 are then screwed on to the inner end of the hub. The clutch and drum attachment are mounted in the usual manner and the device thoroughly lubricated by means of the fittings 18.

When the clutch 17 is engaging the sleeve 15 to rotate the wheel independent of the drum 16, the bearings 7 do not function as such, but merely rotate with said axle and wheel. But when the clutch is shifted outwardly to engage and operate the drum independent of the wheel, the bearings 7 serve as hub bearings, to enable the axle shaft to freely rotate within the hub 8 to operate the drum on said hub sleeve 15, without jacking the rear wheel of the vehicle.

From the foregoing it is believed that my invention may be clearly understood without further description, it being borne in mind that numerous changes may be made in the details of construction without departing from the spirit of the invention as disclosed in the following claims.

What I claim and desire to secure by Letters Patent is:—

1. In combination with a motor driven vehicle, an axle, an axle housing, a wheel rotatably mounted on said axle, bearings in said housing at the hub end thereof, mounted on said axle, said axle being rotatably mounted in the hub of said wheel, and bearings in said hub rotatably supporting said axle.

2. In combination with a motor driven vehicle an axle, an axle housing, bearings in said housing in the hub end thereof mounted on said axle, said axle being rotatably mounted in a hub and wheel, and bearings in said hub rotatably supporting said axle, said first named bearings functioning whenever said axle rotates, and said last named bearings functioning only when said wheel is stationary.

In testimony whereof I affix my signature.

JOHN C. THOMAS.